(12) United States Patent
Jeter et al.

(10) Patent No.: US 10,175,905 B2
(45) Date of Patent: Jan. 8, 2019

(54) SYSTEMS AND METHODS FOR DYNAMICALLY SWITCHING MEMORY PERFORMANCE STATES

(71) Applicant: Apple Inc., Cupertino, CA (US)

(72) Inventors: Robert E. Jeter, Santa Clara, CA (US); Liang Deng, Saratoga, CA (US); Kai Lun Hsiung, Fremont, CA (US); Manu Gulati, Saratoga, CA (US); Rakesh L. Notani, Sunnyvale, CA (US); Sukalpa Biswas, Fremont, CA (US); Venkata Ramana Malladi, Santa Clara, CA (US); Gregory S. Mathews, Saratoga, CA (US); Enming Zheng, Saratoga, CA (US); Fabien S. Faure, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 15/263,833

(22) Filed: Sep. 13, 2016

(65) Prior Publication Data

US 2018/0074743 A1 Mar. 15, 2018

(51) Int. Cl.
*G06F 1/32* (2006.01)
*G06F 3/06* (2006.01)
(Continued)

(52) U.S. Cl.
CPC .............. *G06F 3/0634* (2013.01); *G06F 1/08* (2013.01); *G06F 1/324* (2013.01); *G06F 3/0625* (2013.01);
(Continued)

(58) Field of Classification Search
CPC .................. G06F 3/06; G06F 1/08; G06F 1/32
See application file for complete search history.

(56) References Cited

U.S. PATENT DOCUMENTS 5,696,952 A 12/1997 Pontarelli
6,460,125 B2 10/2002 Lee et al.
(Continued)

FOREIGN PATENT DOCUMENTS

CN 105913868 A 8/2016

OTHER PUBLICATIONS

International Search Report and Written Opinion in International Application No. PCT/US2017/049290, dated Nov. 30, 2017, 10 pages.
(Continued)

*Primary Examiner* — Kim Huynh
*Assistant Examiner* — Kevin M Stewart
(74) *Attorney, Agent, or Firm* — Meyertons Hood Kivlin Kowert and Goetzel PC; Rory D. Rankin

(57) ABSTRACT

Systems, apparatuses, and methods for improved memory controller power management techniques. An apparatus includes control logic, one or more memory controller(s), and one or more memory devices. If the amount of traffic and/or queue depth for a given memory controller falls below a threshold, the clock frequency supplied to the given memory controller and corresponding memory device(s) is reduced. In one embodiment, the clock frequency is reduced by one half. If the amount of traffic and/or queue depth rises above the threshold, then the clock frequency is increased back to its original frequency. The clock frequency may be adjusted by doubling the divisor used by a clock divider, which enables fast switching between the original rate and the reduced rate. This in turn allows for more frequent switching between the low power and normal power states, resulting in the memory controller and memory device operating more efficiently.

20 Claims, 9 Drawing Sheets

(51) Int. Cl.
   *G06F 1/08*   (2006.01)
   *G06F 13/16*  (2006.01)
   *G06F 13/42*  (2006.01)
(52) U.S. Cl.
   CPC .......... *G06F 3/0653* (2013.01); *G06F 3/0659* (2013.01); *G06F 3/0673* (2013.01); *G06F 3/0683* (2013.01); *G06F 13/1689* (2013.01); *G06F 13/4243* (2013.01)

(56) References Cited

U.S. PATENT DOCUMENTS

| | | |
|---|---|---|
| 6,701,446 B2 | 3/2004 | Tsern et al. |
| 2001/0011356 A1 | 8/2001 | Lee et al. |
| 2006/0187226 A1* | 8/2006 | Bruno .................. G06F 1/3203 345/534 |
| 2010/0005214 A1 | 1/2010 | Trombley et al. |
| 2013/0054989 A1* | 2/2013 | Judd ...................... G06F 1/324 713/320 |
| 2013/0262791 A1* | 10/2013 | Henderson ............. G06F 1/324 711/154 |
| 2014/0176586 A1* | 6/2014 | Gruber ................ G06F 12/0607 345/533 |
| 2015/0006924 A1* | 1/2015 | Jain ....................... G06F 1/3203 713/320 |
| 2015/0121057 A1* | 4/2015 | Arora .................... G06F 1/3228 713/100 |
| 2016/0125923 A1* | 5/2016 | Lee ..................... G06F 13/1684 365/226 |
| 2017/0285682 A1 | 10/2017 | Huang |

OTHER PUBLICATIONS

Deng, et al., "MemScale: Active Low-Power Modes for Main Memory", Proceedings of the 16th International Conference on Architectural Support for Programming Languages and Operating Systems, 14 pages, Mar. 5-11, 2001, ACM, New York, NY, USA.

David, et al., "Memory Power Management via Dynamic Voltage/Frequency Scaling", Proceedings of the 8th ACM International Conference on Autonomic Computing, Jun. 14-18, 2011, pp. 1-10, ACM, New York, NY, USA.

* cited by examiner

SYSTEMS AND METHODS FOR DYNAMICALLY SWITCHING MEMORY PERFORMANCE STATES

BACKGROUND

Technical Field

Embodiments described herein relate to the field of computer systems and more particularly, to optimizing memory power management techniques.

Description of the Related Art

Increasingly, electronic devices use power management techniques in order to reduce power consumption. In some cases the devices may rely on power supplied by a battery and power management techniques may prolong the operating time of the device before recharging of the battery is required. There is typically a tradeoff between power consumption and performance as a reduction in power consumption often results in a reduction in performance. Consequently, improved methods for determining when and how to utilize power management techniques are desirable. Often during the operation of a device, some workloads do not utilize the full bandwidth of the memory devices. Accordingly, ways of reducing the power consumption of the memory system when possible can help increase the operating time of the device before recharging of the battery is required.

SUMMARY

Systems, apparatuses, and methods for implementing improved power management techniques are contemplated.

In one embodiment, an apparatus may include at least memory clock control logic, one or more memory controllers, and one or more memory devices coupled to the memory controller(s). In one embodiment, the apparatus is configured to dynamically reduce the memory clock frequency when the memory controller detects a low memory bandwidth state. In one embodiment, the memory clock control logic detects the low memory bandwidth state by monitoring memory request traffic and queue depths over a programmable time period. If the control logic detects the existence of the low memory bandwidth state, then the control logic switches the memory clock frequency to a lower speed to reduce power consumption. In one embodiment, the memory clock frequency is reduced to half the nominal memory clock frequency. In other embodiment, the memory frequency may be reduced by other amounts.

In one embodiment, once the memory clock frequency is switched to a lower speed, the memory clock frequency remains at the lower speed until an event for exiting the reduced memory clock frequency state is detected. Depending on the embodiment, the given event may be a calibration event, a power gating exit, a frequency and voltage change initiated by software, or increased memory bandwidth requirements or increased memory controller queue depths. In one embodiment, if any of these events is detected, then the memory frequency is increased back to the original frequency.

In one embodiment, the control logic monitors whether a calibration event is scheduled to occur within a given period of time. For example, if a calibration event is scheduled to occur within the given period of time, then the control logic may delay the reduction in the memory clock frequency until after the calibration event occurs. In one embodiment, the control logic monitors whether a bus turnaround will occur within a given period of time. If the control logic determines a bus turnaround is about to occur and the control logic also detects a low memory bandwidth state, then the control logic may schedule the reduction of the memory clock frequency to occur at the same time as the bus direction change.

In one embodiment, a system includes control logic, a plurality of memory controllers, a plurality of memory channels, and a plurality of memory devices. First and second memory controllers may operate using the nominal memory clock frequency for a certain period of time, and then control logic may detect a low memory bandwidth state for the second memory controller while control logic does not detect a low memory bandwidth state for the first memory controller. In response to detecting the low memory bandwidth state, the control logic may reduce the memory clock frequency for the second memory controller on a second memory channel while at the same time the first memory controller utilizes the nominal memory clock frequency for a first memory channel. Generally speaking, the memory clock frequency of each memory controller may be adjusted independently of the other memory controllers.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
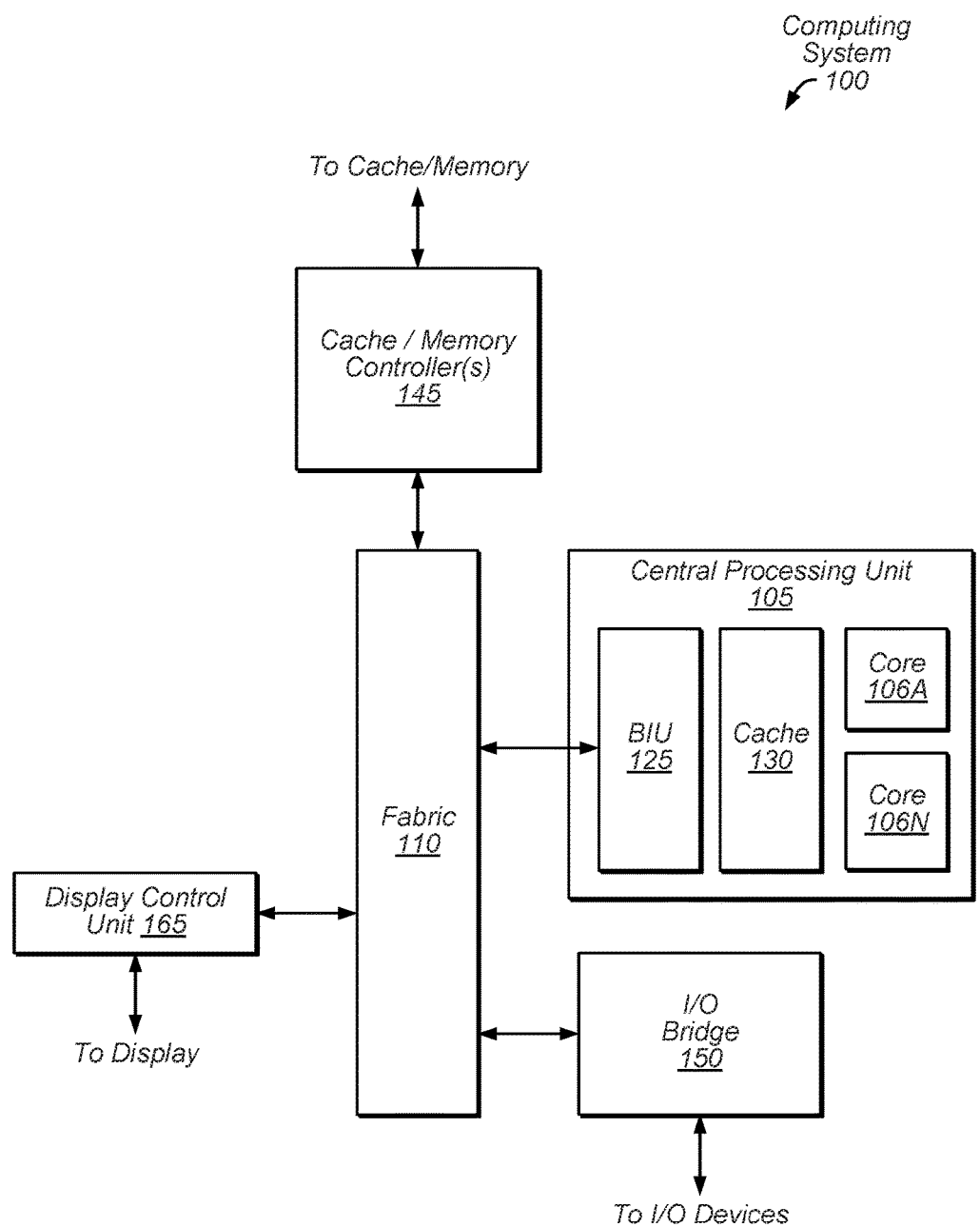
FIG. 1 is a block diagram illustrating one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a memory controller . . . ." Such a claim does not foreclose the system from including additional components (e.g., a processor, a display control unit, a display).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a computing system 100. In some embodiments, some or all elements of the computing system 100 may be included within a system on a chip (SoC). In some embodiments, computing system 100 may be included in a mobile device. In the illustrated embodiment, the computing system 100 includes fabric 110, central processing unit (CPU) 105, input/output (I/O) bridge 150, cache/memory controller 145, and display control unit 165. Although the computing system 100 illustrates central processing unit 105 as being connected to fabric 110 as a sole central processing unit of the computing system 100, in other embodiments, central processing unit 105 may be connected to or included in other components of the computing system 100 and other central processing units may be present. Additionally or alternatively, the computing system 100 may include multiple central processing units 105. The multiple central processing units 105 may include different units or equivalent units, depending on the embodiment.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

In the illustrated embodiment, central processing unit 105 includes bus interface unit (BIU) 125, cache 130, and cores 106A and 106N. In various embodiments, central processing unit 105 may include various numbers of cores and/or caches. For example, central processing unit 105 may include 1, 2, or 4 processor cores, or any other suitable number. In some embodiments, cores 106A and/or 106N include internal instruction and/or data caches. In some embodiments, a coherency unit (not shown) in fabric 110, cache 130, or elsewhere in computing system 100 may be configured to maintain coherency between various caches of computing system 100. BIU 125 may be configured to manage communication between central processing unit 105 and other elements of computing system 100. Processor cores such as cores 106A and 106N may be configured to execute instructions of a particular instruction set architecture (ISA), which may include operating system instructions and user application instructions.

Cache/memory controller 145 may be configured to manage transfer of data between fabric 110 and one or more caches and/or memories (e.g., non-transitory computer readable mediums). In one embodiment, the memory is implemented using dynamic random-access memory (DRAM) devices. In other embodiments, the memory may be implemented using other types of memory devices. For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

Display control unit 165 may be configured to read data from a frame buffer and provide a stream of pixel values for display. Display control unit 165 may be configured as a display pipeline in some embodiments. Furthermore, display control unit 165 may include one or more interfaces (e.g., MIPI® or embedded display port (eDP)) for coupling to a user display (e.g., a touchscreen or an external display). I/O bridge 150 may include various elements such as universal serial bus (USB) communications, security, audio, and/or low-power always-on functionality, for example. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150. In some embodiments, central processing unit 105 may be coupled to computing system 100 via I/O bridge 150.

It is noted that the number of components of system 100 (and the number of subcomponents for those shown in FIG. 1, such as within the central processing unit 105) may vary from embodiment to embodiment. There may be more or fewer of each component/subcomponent than the number shown in FIG. 1. It is also noted that system 100 may include many other components not shown in FIG. 1. In various embodiments, system 100 may also be referred to as a system on chip (SoC), an integrated circuit (IC), an application specific integrated circuit (ASIC), or an apparatus.

Figure 2:
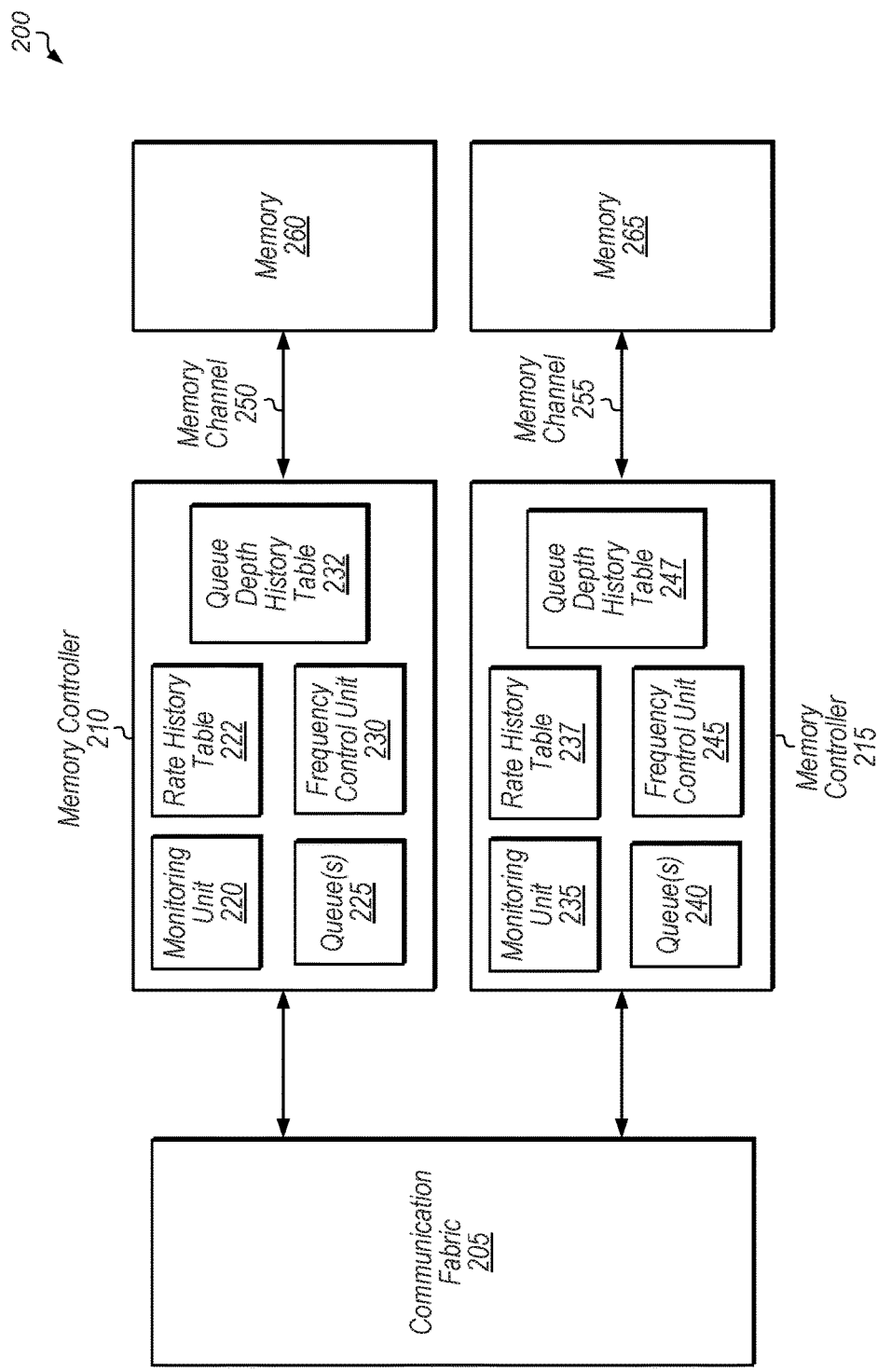
FIG. 2 is a block diagram of another embodiment of a computing system.

Turning now to FIG. 2, another embodiment of a computing system 200 is shown. System 200 includes communication fabric 205, memory controllers 210 and 215, memory channels 250 and 255, and memory devices 260 and 265. It is noted that system 200 may also include additional components and/or logic which are not shown in FIG. 2 to avoid obscuring the figure. It is also noted that system 200 may include more than two memory controllers, memory channels, and memory devices in other embodiments.

Communication fabric 205 may be connected to any number of agents (not shown) for generating memory requests targeting the physical address space of memories 260 and 265. Communication fabric 205 is configured to route each memory request to the appropriate memory controller 210 or 215 depending on the address targeted by the memory request. As shown in FIG. 2, memory controller 210 is coupled to memory 260 via memory channel 250 and memory controller 215 is coupled to memory 265 via memory channel 255. Memory channels 250 and 255 include data lines, address lines, status lines, and one or more clock lines. In one embodiment, the frequency of the clock supplied to memories 260 and 265 via memory channels 250 and 255 may be controlled by frequency control units 230 and 245, respectively. Monitoring units 220 and 235 are configured to send control signals to frequency control units 230 and 245, respectively, to program the clock frequencies generated for memories 260 and 265. In one embodiment, memory controllers 210 and 215 also receive commands generated by one or more software agents, and these commands are conveyed to memory controllers 210 and 215 via communication fabric. These commands may control the memory clock frequencies at a coarse granularity compared to the local decisions regarding memory clock frequency made by memory controllers 210 and 215. In other words, memory controller 210 and 215 are able to change the memory clock frequency more quickly than the software agents.

Memory controller 210 includes monitoring unit 220 for monitoring the memory bandwidth being consumed by memory controller 210 for its received memory requests. In other words, monitoring unit 220 monitors the traffic generated by communication fabric 205 and conveyed to memory controller 215. Similarly, memory controller 215 includes monitoring unit 235 for monitoring the memory bandwidth being consumed by memory controller 215 for its received memory requests. In one embodiment, monitoring unit 220 monitors the memory bandwidth at the input of memory controller 210. This prevents monitoring unit 220 from mistakenly indicating a low memory bandwidth condition if memory controller 210 is blocked due to a calibration physical layer (PHY) update or a memory command sequence that results in low memory utilization. In one embodiment, monitoring unit 220 is reset on an exit from power gating or on a software initiated frequency change.

In one embodiment, monitoring unit 220 also monitors the occupancy of queue(s) 225. Queue(s) 225 are representative of any number and type of queues for storing pending requests received by memory controller 210. In one embodiment, if monitoring unit 220 detects that the occupancy of one or more of queue(s) 225 is above a programmable threshold, then monitoring unit 220 blocks entry into a reduced memory clock frequency state. Additionally, if the memory clock frequency has already been reduced, then if the occupancy of one or more of queue(s) 225 is above a programmable threshold, then monitoring unit 220 may trigger an exit from the reduced memory clock frequency state. Monitoring unit 235 monitors the queue(s) 240 of memory controller 215 in a similar manner.

Memory controller 210 also include rate history table 222 for tracking the memory bandwidth usage over time. For example, in one embodiment, monitoring unit 220 records the number of incoming requests to memory controller 210 over a programmable number of cycles (e.g., 64 cycles). If the number of requests exceeds a programmable threshold then the input to rate history table 222 will be "1" otherwise the input will be set to "0". Rate history table 222 has a programmable number of entries. In one embodiment, monitoring unit 220 determines if a low or high memory bandwidth condition exists by comparing the number of "0" or "1" entries in rate history table 222 to a threshold. For example, if the number of "1" entries is above the threshold, then monitoring unit 220 may conclude that memory controller 210 is in a high memory bandwidth state. Otherwise, if the number of "1" entries is below the threshold, then monitoring unit 220 may conclude that memory controller 210 is in a low memory bandwidth state. Rate history table 237 of memory controller 215 may be utilized in a similar fashion to rate history table 222 of memory controller 210. In other embodiments, other methods and mechanisms for tracking the memory bandwidth usage are possible and are contemplated.

In one embodiment, memory controller 210 also includes queue depth history table 232. Queue depth history tables 232 and 247 (of memory controller 215) may be utilized in a similar fashion to rate history table 222. For example, in one embodiment, monitoring unit 220 stores a "1" or "0" in queue depth history table 232 if the number of requests stored in queue(s) 225 is above or below a threshold, respectively. Then, monitoring unit 220 compares the number of "1" or "0" entries to a threshold to determine whether to block entry or force an exit from a reduced memory clock frequency state.

In one embodiment, monitoring unit 220 is configured to send an indication to frequency control unit 230 when a reduced memory clock frequency state should be initiated. Frequency control unit 230 is configured to reduce the memory clock frequency provided to memory 260 responsive to receiving this indication from monitoring unit 220. Additionally, frequency control unit 245 is configured to reduce the memory clock frequency provided to memory 265 responsive to receiving an indication from monitoring unit 235.

It should be understood that memory controller 210 may operate independently from memory controller 215 such that the memory clock frequency generated for each memory controller is independent of the other memory controller. Accordingly, the control logic shown in each memory controller 210 and 215 may monitor local conditions and make decisions based on the local performance regardless of the conditions and decisions made by the other memory controller. This situation may also be applied to systems with three or more memory controllers, with each memory controller being monitored independently of the other memory controllers.

It is noted that the logic of memory controller 210 and memory controller 215 can be arranged differently in other embodiments. For example, two or more of the units within memory controller 210 and memory controller 215 may be combined, one or more of the units may be omitted, and/or one or more additional units may be included within memory controller 210 and memory controller 215 in other embodiments. It is also noted that one or more of the units shown within memory controller 210 or memory controller 215 may be located externally to memory controller 210 or memory controller 215 in other embodiments.

Figure 3:
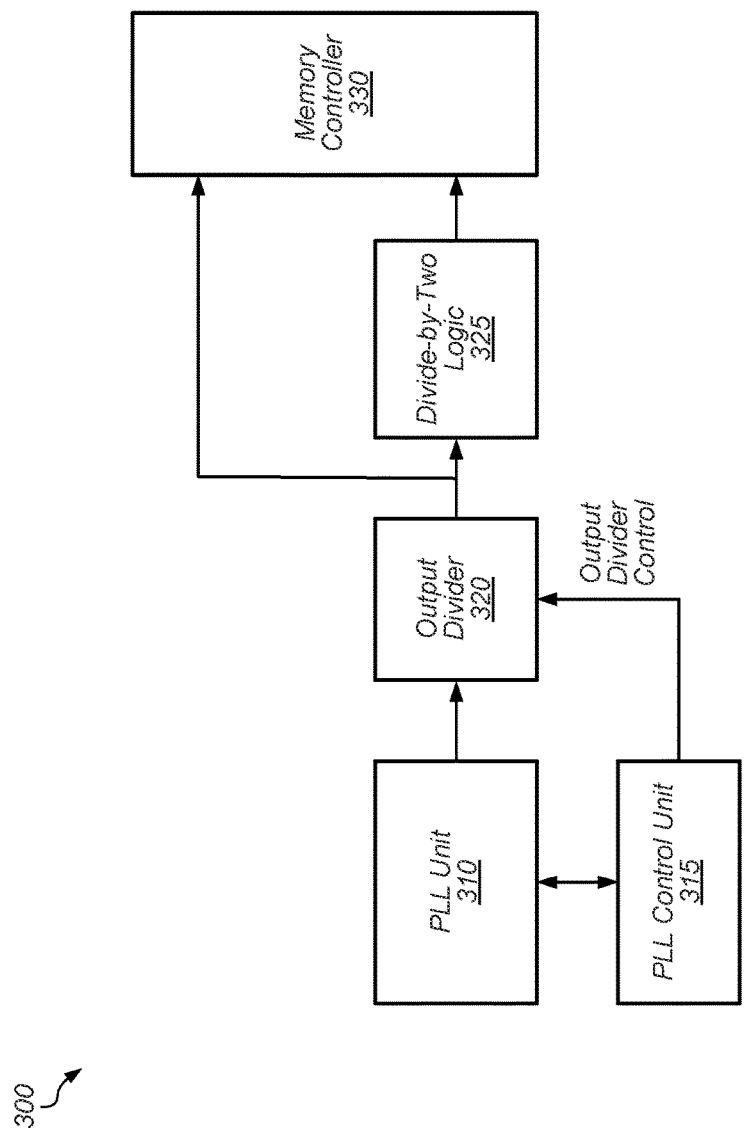
FIG. 3 is a block diagram illustrating one embodiment of memory clock control logic.

Referring now to FIG. 3, a block diagram of one embodiment of memory clock control logic 300 is shown. In one embodiment, memory clock control logic 300 includes phase-locked loop (PLL) unit 310, PLL control unit 315, output divider 320, divide-by-two logic 325, and memory controller 330. In other embodiments, memory clock control logic 300 may include other logic and/or may be organized in other suitable manners. In various embodiments, memory clock control logic 300 may be located within system 100 (of FIG. 1) and/or system 200 (of FIG. 2). For example, a portion or the entirety of memory clock control logic 300 may be located in fabric 110 and/or memory controller 145 of system 100. Alternatively, a portion or the entirety of memory clock control logic 300 may be located in fabric 205 and/or memory controller 210 of system 200.

PLL unit 310 is configured to generate a clock frequency which is coupled to memory controller 330. PLL control unit 315 is configured to convey control signals to PLL unit 310 to control the frequency generated by PLL unit 310, and PLL control unit 315 is configured to convey output divider control signals to output divider 320. Output divider 320 is configured to divide the input frequency received from PLL unit 310 by a divisor value specified by PLL control unit 315.

In one embodiment, when control logic 300 determines that memory controller 330 has reached a low bandwidth state, then control logic 300 may reduce the clock frequency provided to memory controller 330 and its corresponding memory devices. For example, if control logic 300 determines that memory controller 330 has entered a low bandwidth state, and no other conditions are detected for preventing the clock frequency from being reduced, then PLL control unit 315 may send new output divider control signals to output divider 320 to reduce the clock frequency. In one embodiment, PLL control unit 315 may send a command to output divider 320 for reducing the output clock frequency by one half. For example, if the nominal clock frequency is 1 gigahertz (GHz), then PLL control unit 315 may reduce the output clock frequency to 500 megahertz (MHz).

In one embodiment, the clock frequency output from output divider 320 may be coupled to divide-by-two logic 325 and to memory controller 330. Divide-by-two logic 325 is configured to divide the received clock frequency by two and then convey half the received clock frequency to memory controller 330. In one embodiment, memory controller 330 may include separate clock domains, with some logic operating at the full clock frequency and other logic operating at half of the full clock frequency. In other embodiments, the logic of memory controller 330 may operate at other numbers of clock frequencies and/or at clock frequencies which are different ratios of the full clock frequency. In another embodiment, divide-by-two logic 325 may be omitted from memory clock control logic 300.

Figure 4:
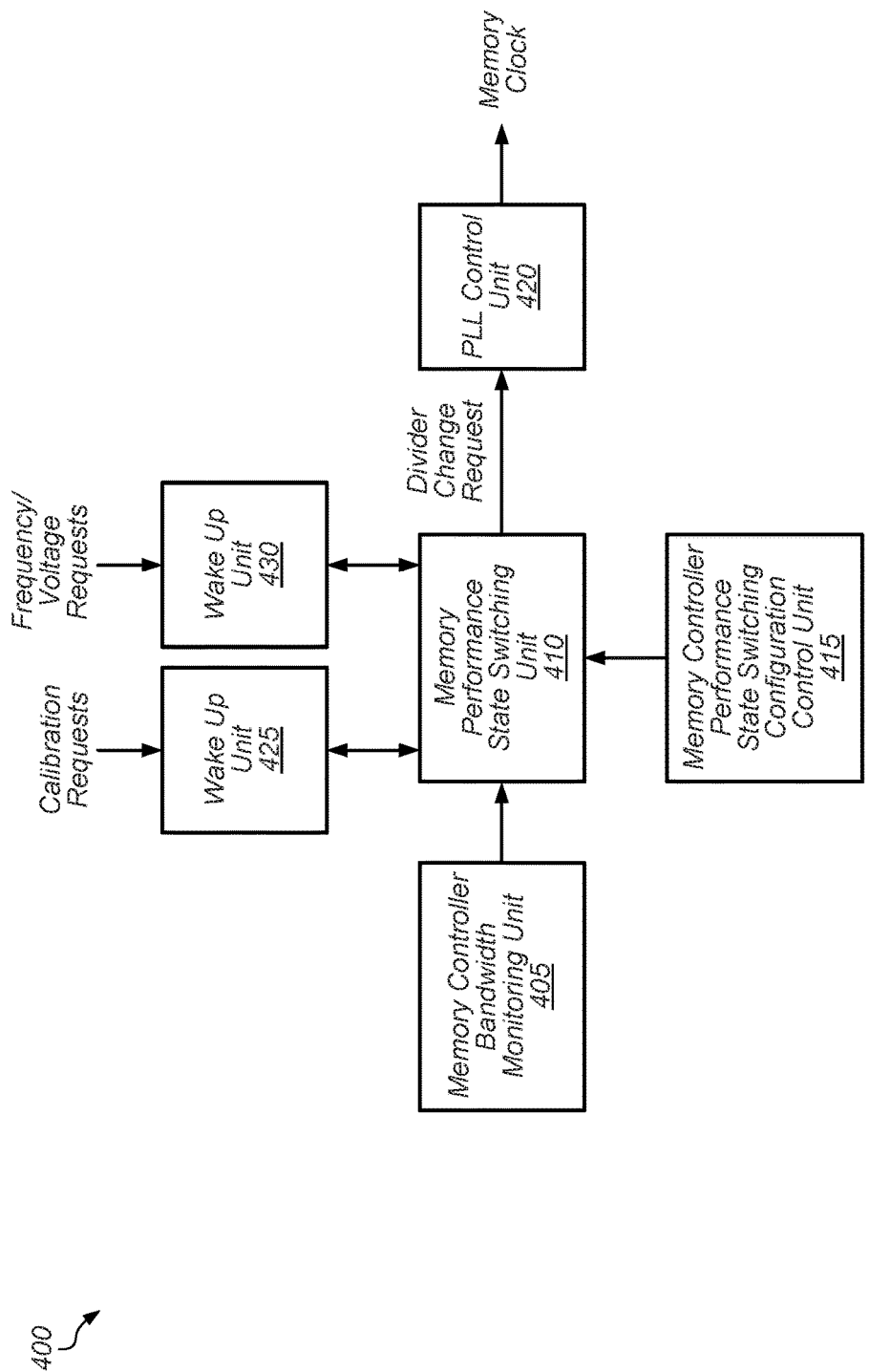
FIG. 4 is a block diagram illustrating another embodiment of memory clock control logic.

Turning now to FIG. 4, a block diagram of another embodiment of memory clock control logic 400 is shown. In one embodiment, control logic 400 includes memory controller bandwidth monitoring unit 405, memory performance state switching unit 410, memory controller performance state switching configuration control unit 415, PLL control unit 420, and wake-up units 425 and 430. In one embodiment, memory controller bandwidth monitoring unit 405 includes one or more of the units (e.g., monitoring unit 220, rate history table 222, queue depth history table 232) included within memory controllers 210 and 215 of FIG. 2. In other embodiments, control logic 400 may include other logic and/or be arranged in other suitable manners. In various embodiments, control logic 400 may be located within system 100 (of FIG. 1) and/or system 200 (of FIG. 2). For example, a portion or the entirety of control logic 400 may be located in fabric 110 and/or memory controller 145 of system 100. Alternatively, a portion or the entirety of memory clock control logic 300 may be located in fabric 205 and/or memory controller 210 of system 200.

Memory controller bandwidth monitoring unit 405 is configured to monitor the bandwidth consumption of the memory controller (e.g., memory controller 210 of FIG. 2). In some embodiments, memory controller bandwidth monitoring unit 405 is also configured to monitor the queue depth of the memory controller queues. Memory controller bandwidth monitoring unit 405 may also be configured to monitor one or more other conditions (e.g., timing of upcoming calibration events, bus reversal timing). Memory controller bandwidth monitoring unit 405 is configured to convey a status of the current bandwidth state of the memory controller to memory performance state switching unit 410. This status may indicate the current bandwidth state of the memory controller. In one embodiment, there may be two bandwidth states (high and low), while in other embodiments, there may be four bandwidth states, eight bandwidth states, or other numbers of bandwidth states.

Memory performance state switching unit 410 may also receive configuration control information from memory controller performance state switching configuration control unit 415. Additionally, memory performance state switching unit 410 may receive indications of calibration requests from wake-up unit 425 and indications of frequency/voltage requests from wake-up unit 430. Based on these inputs, memory performance state switching unit 410 determines what memory clock frequency to generate for the corresponding memory device(s). Then, memory performance state switching unit 410 conveys a divider change request to PLL control unit 420 if memory performance state switching unit 410 determines that the current memory clock frequency should be changed. PLL control unit 420 is configured to change the memory clock frequency being generated in response to receiving the divider change request from memory performance state switching unit 410.

Figure 5:
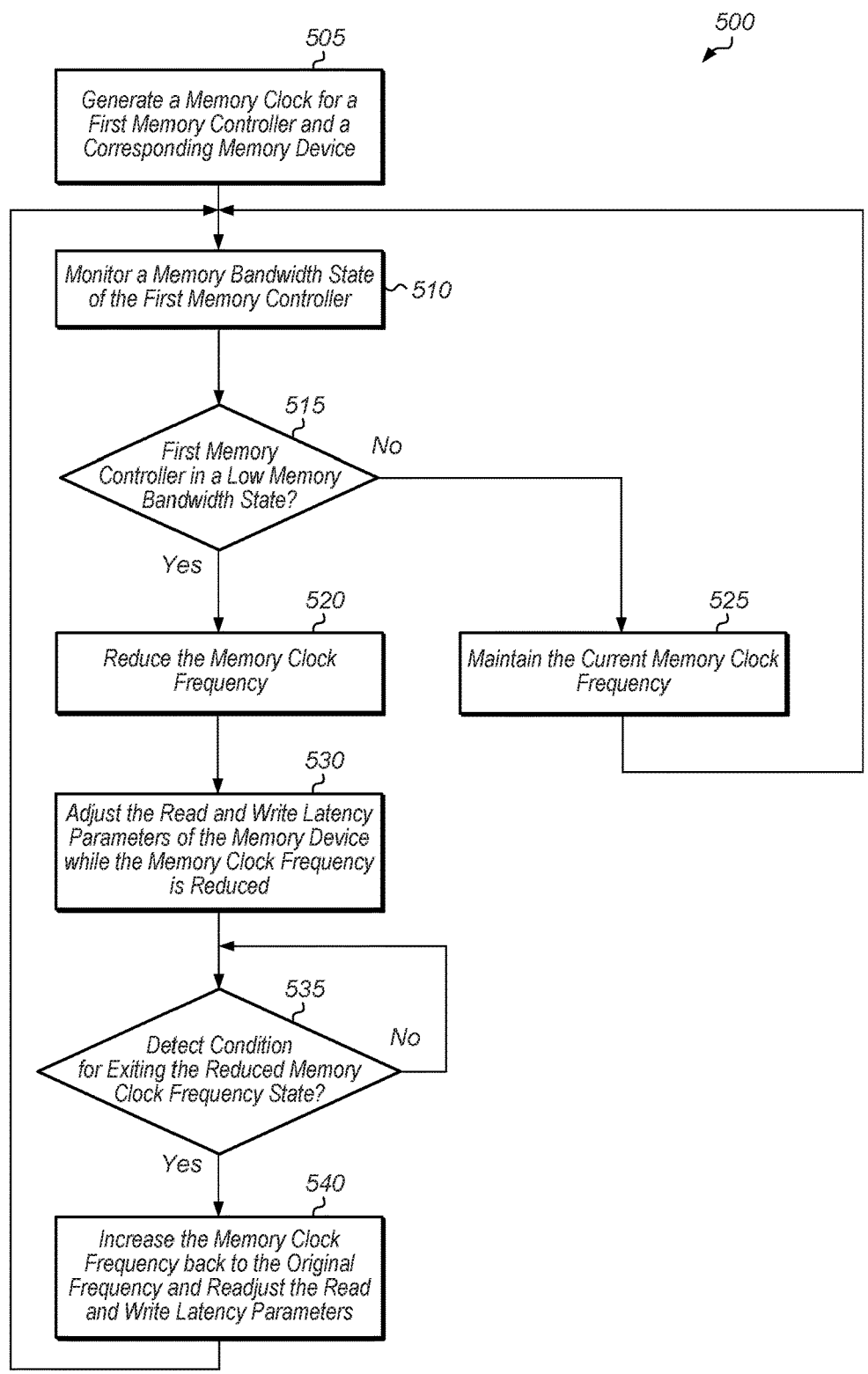
FIG. 5 is a generalized flow diagram illustrating one embodiment of a method for adjusting a memory clock frequency.

Referring now to FIG. 5, one embodiment of a method 500 for adjusting a memory clock frequency is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 500.

A memory clock is generated for a first memory controller and a corresponding memory device (block 505). In one embodiment, the first memory controller is part of a host system which includes a plurality of memory controllers coupled to a plurality of memory devices. Depending on the embodiment, the host system may be a mobile device (e.g., tablet, smartphone), wearable device, computer, or other computing device or system. In another embodiment, the first memory controller is part of a host system or apparatus with only a single memory controller.

A monitoring unit monitors a memory bandwidth state of the first memory controller (block 510). The monitoring unit may be implemented using any combination of software and/or hardware. In one embodiment, the memory bandwidth state is determined by tracking incoming requests to the first memory controller. Additionally, in one embodiment, the monitoring unit monitors the memory bandwidth state of a first memory controller independently of the memory bandwidth state of other memory controllers in the host system.

Next, the monitoring unit determines if the first memory controller is in a low memory bandwidth state (conditional block 515). In one embodiment, the monitoring unit may monitor the number of incoming memory requests and number of requests stored in the pending request queue(s) and compare these numbers to various thresholds in order to determine if the first memory controller is in a low memory bandwidth state. In other embodiments, the monitoring unit may monitor these parameters and one or more other parameters to determine if the first memory controller is in a low memory bandwidth state.

If the first memory controller has reached a low memory bandwidth state (conditional block 515, "yes" leg), then the memory clock frequency is reduced (block 520). It is noted that when the memory clock frequency is reduced in block 520, the voltage supplied to the memory device is kept the same. This is different than the typical approach, which reduces clock frequency and voltage together. By only reducing the clock frequency, the reduction may be performed more quickly with less downtime. Also, the reduction of the clock frequency can be implemented without also performing a calibration event to recalibrate the memory device. In one embodiment, the memory clock frequency is reduced in half, resulting in a frequency equal to the previous memory clock frequency divided by two. In other embodiments, the memory clock frequency is reduced by other amounts. If the first memory controller has not reached a low memory bandwidth state (conditional block 515, "no" leg), then the current memory clock frequency is maintained (block 525). After block 525, method 500 may return to block 510. It is noted that in some embodiments, software executing on a CPU or other processor may reprogram and change the memory clock frequency independently of method 500. However, these changes may happen infrequently as compared to the dynamic changes made by implementing method 500.

After block 520, the read and write latency parameters of the memory device are adjusted while the memory clock frequency is reduced (block 530). For example, in one embodiment, the read and write latency parameters of the memory device are specified as a certain number of clock cycles. Accordingly, these read and write latency parameters can be decreased when the memory clock frequency is reduced since the period of the clock cycle will increase. In other embodiments, other parameters of the memory device may be adjusted while the memory clock frequency is reduced.

After block 530, if a condition for exiting the reduced memory clock frequency state is detected (conditional block 535, "yes" leg), then the frequency of the memory clock is increased back to the original frequency and the read and write latency parameters are readjusted back to their original values (block 540). Conditions for exiting the reduced memory clock frequency state may vary from embodiment to embodiment, with the conditions including detecting an impending calibration event, detecting increased memory bandwidth consumption by the memory controller, or detecting another event. If a condition for exiting the reduced memory clock frequency state is not detected (conditional block 535, "no" leg), then method 500 may remain at conditional block 535.

Figure 6:
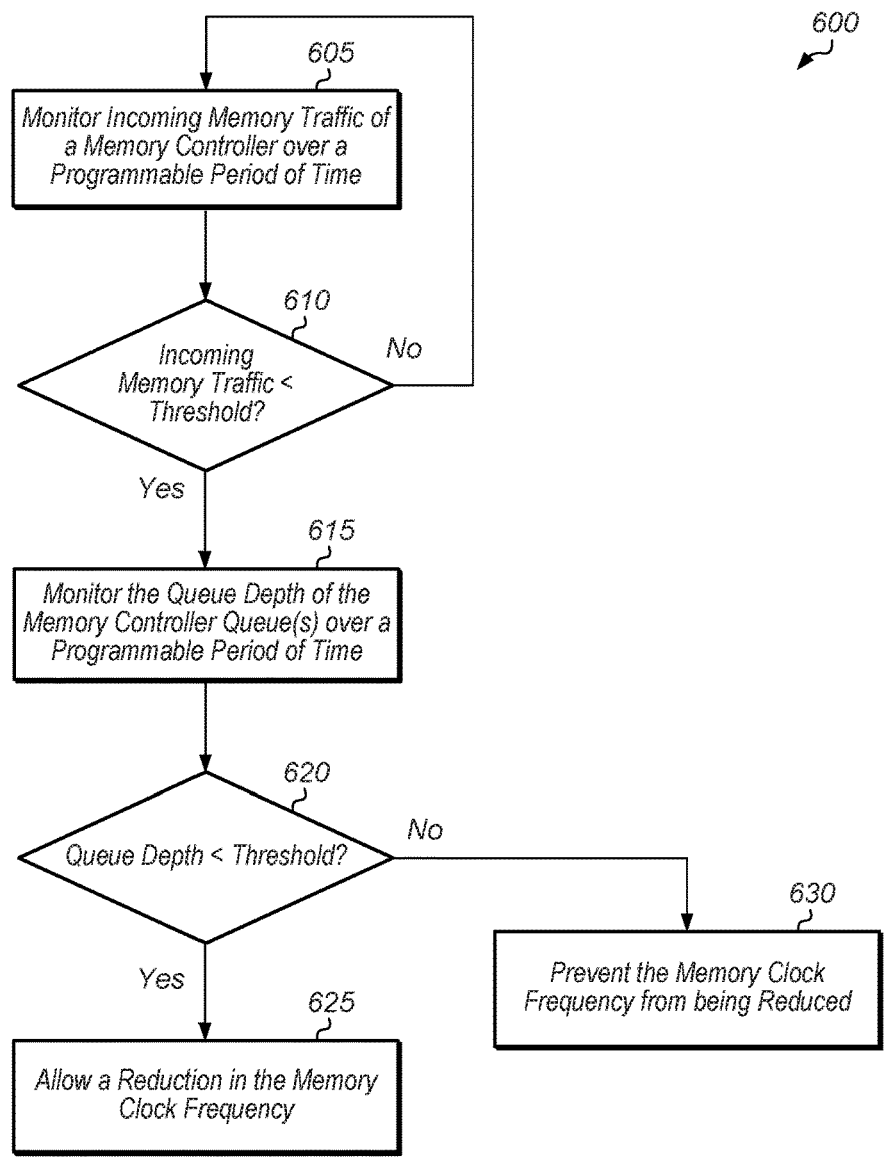
FIG. 6 is a generalized flow diagram illustrating another embodiment of a method for adjusting a memory clock frequency.

Turning now to FIG. 6, another embodiment of a method 600 for adjusting a memory clock frequency is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 600.

A monitoring unit monitors incoming memory traffic of a memory controller over a programmable period of time (block 605). If the incoming memory traffic is less than a threshold (conditional block 610, "yes" leg), then the monitoring unit monitors the queue depth of the memory controller queue(s) over a programmable period of time (block 615). It is noted that block 615 may be performed simultaneously with block 605. If the incoming memory traffic is greater than the threshold (conditional block 610, "no" leg), then method 600 may return to block 605.

If the queue depth of the memory controller over the programmable period of time is less than a threshold (conditional block 620, "yes" leg), then the monitoring unit allows a reduction in the memory clock frequency (block 625). If the queue depth of the memory controller over the programmable period of time is greater than the threshold (conditional block 620, "yes" leg), then the monitoring unit prevents the memory clock frequency from being reduced (block 630). After blocks 625 and 630, method 600 may end.

Figure 7:
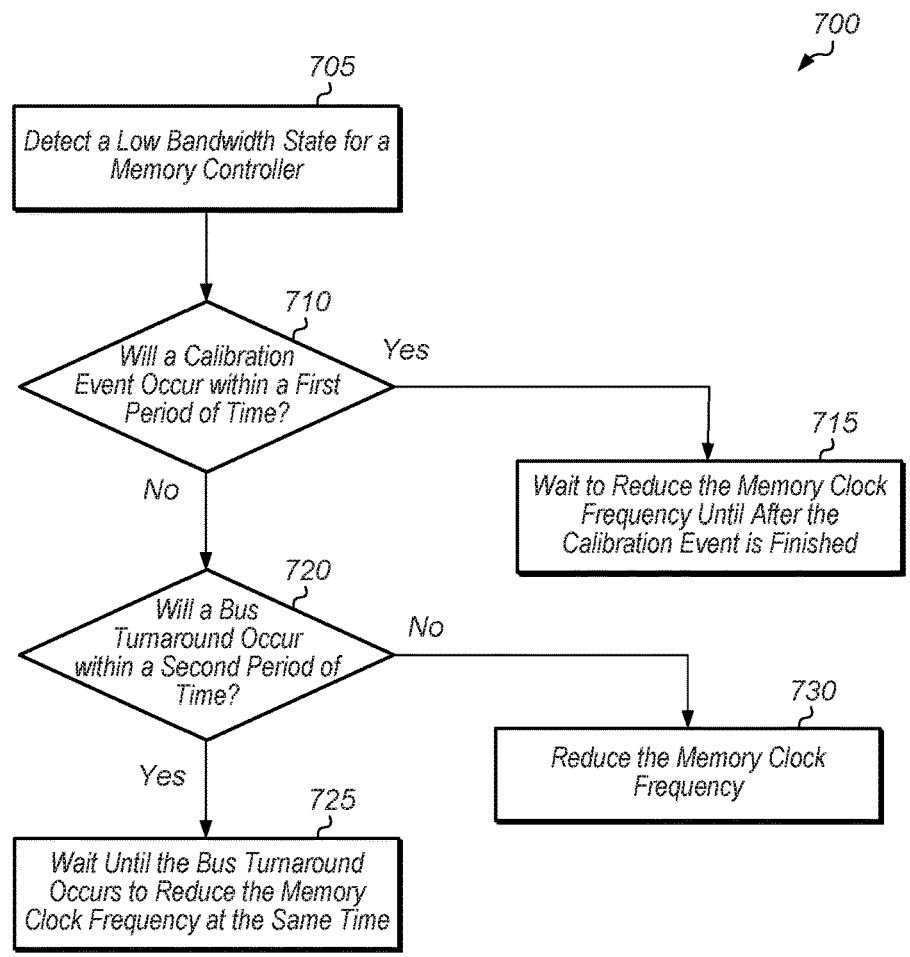
FIG. 7 is a generalized flow diagram illustrating one embodiment of a method for determining when to adjust a memory clock frequency.

Referring now to FIG. 7, one embodiment of a method 700 for determining when to adjust a memory clock frequency is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 700.

A monitoring unit detects a low bandwidth state for a memory controller (block 705). In one embodiment, a low bandwidth state is detected when the number of incoming memory requests over a given period of time is below a threshold. After detecting the low bandwidth state, the monitoring unit determines if a calibration event will occur within a first period of time (conditional block 710). In one embodiment, a calibration event can only be performed on the memory device when the memory clock speed is at the nominal frequency. In one embodiment, the monitoring unit checks the schedule for performing upcoming calibration events. In another embodiment, the monitoring unit receives a notification when a calibration event is about to occur.

If a calibration event will occur within a first period of time (conditional block 710, "yes" leg), then control logic may wait to reduce the memory clock frequency until after the calibration event is finished (block 715). In this embodiment, if a calibration event will occur in the near future, then the control logic may wait until after the calibration event before reducing the memory clock frequently. This will prevent the control logic from reducing the memory clock frequency for only a short period of time before having to increase the memory clock frequency to perform the calibration event. In some cases, multiple calibration events may be scheduled together, and the control logic may wait until all of the scheduled calibration events have been completed before reducing the memory clock frequency. If a calibration event will not occur within a first period of time (conditional block 710, "no" leg), then the monitoring unit may determine if a bus turnaround will occur within a second period of time (conditional block 720). Depending on the embodiment, the second period of time may be shorter than the first period of time, the second period of time may be the same duration as the first period of time, or the second period of time may be longer than the first period of time. The bus turnaround refers to an event when the memory bus will change from performing writes to performing reads or from performing reads to performing writes. When the bus turnaround occurs, the memory controller will finish all outstanding reads/writes and then switch to performing writes/reads on the bus. The control logic may take advantage of an impending bus turnaround by performing the memory clock frequency reduction at the same time as the bus turnaround. This may help to amortize the temporary loss of performance associated with implementing the memory clock frequency reduction.

If a bus turnaround will occur within a second period of time (conditional block 720, "yes" leg), then the control logic waits until the bus turnaround occurs to reduce the memory clock frequency at the same time as the bus turnaround (block 725). If a bus turnaround will occur within a second period of time (conditional block 720, "no" leg), then the control logic reduces the memory clock frequency (block 730). After blocks 715, 725, and 730, method 700 may end. Any of the previously described events for exiting the reduced memory clock frequency may be utilized after blocks 715, 725, and 730 for returning to the nominal memory clock frequency.

Figure 8:
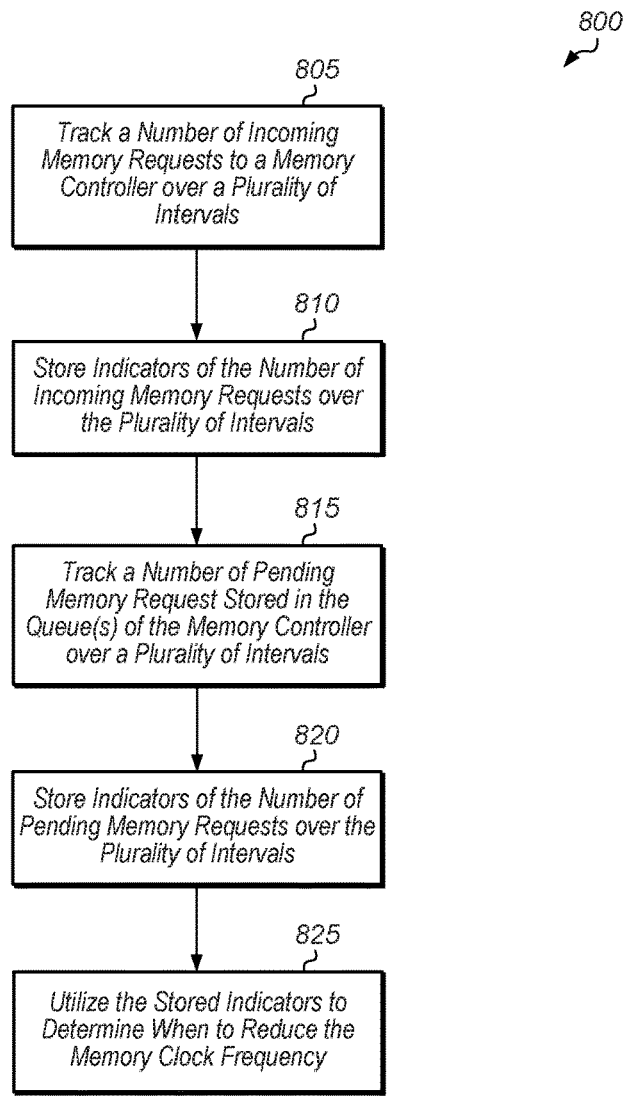
FIG. 8 is a generalized flow diagram illustrating one embodiment of a method for tracking memory controller operating parameters.

Turning now to FIG. 8, one embodiment of a method 800 for tracking memory controller operating parameters is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 800.

A monitoring unit tracks a number of incoming memory requests to a memory controller over a plurality of intervals (block 805). The monitoring unit store indicators of the number of incoming memory requests over the plurality of intervals (block 810). For example, in one embodiment, the monitoring unit compares the number of incoming requests to a threshold for each interval, and the monitoring unit stores a "1" in a table if the number is above the threshold or stores a "0" in the table if the number is below the threshold. In other embodiments, the monitoring unit may utilize other techniques for determining how to store the indicators in the table to track the number of incoming memory requests to the memory controller over the plurality of intervals.

Additionally, the monitoring unit tracks a number of pending memory requests stored in the queue(s) of the memory controller over a plurality of intervals (block 815). The monitoring unit stores indicators of the number of pending memory requests (block 820). For example, in one embodiment, the monitoring unit compares the number of pending requests to a threshold for each interval, and the monitoring unit stores a "1" in the table if the number is above the threshold or stores a "0" if the number is below the threshold. In other embodiments, the monitoring unit may utilize other techniques for determining how to store the indicators in the table to track the number of pending memory requests stored in the queue(s) of the memory controller over a plurality of programmable intervals. Then, control logic utilizes the stored indicators to determine when to reduce the memory clock frequency (block 825). For example, in one embodiment, if the number of "1" indicators for incoming memory requests is less than a first programmable threshold and the number of "1" indicators for pending memory requests stored in the queue(s) is less than a second programmable threshold, then the control logic may reduce the memory clock frequency. In other embodiments, other techniques for determining when to reduce the memory clock frequency based on the stored indicators may be utilized. After block 825, method 800 may end.

Figure 9:
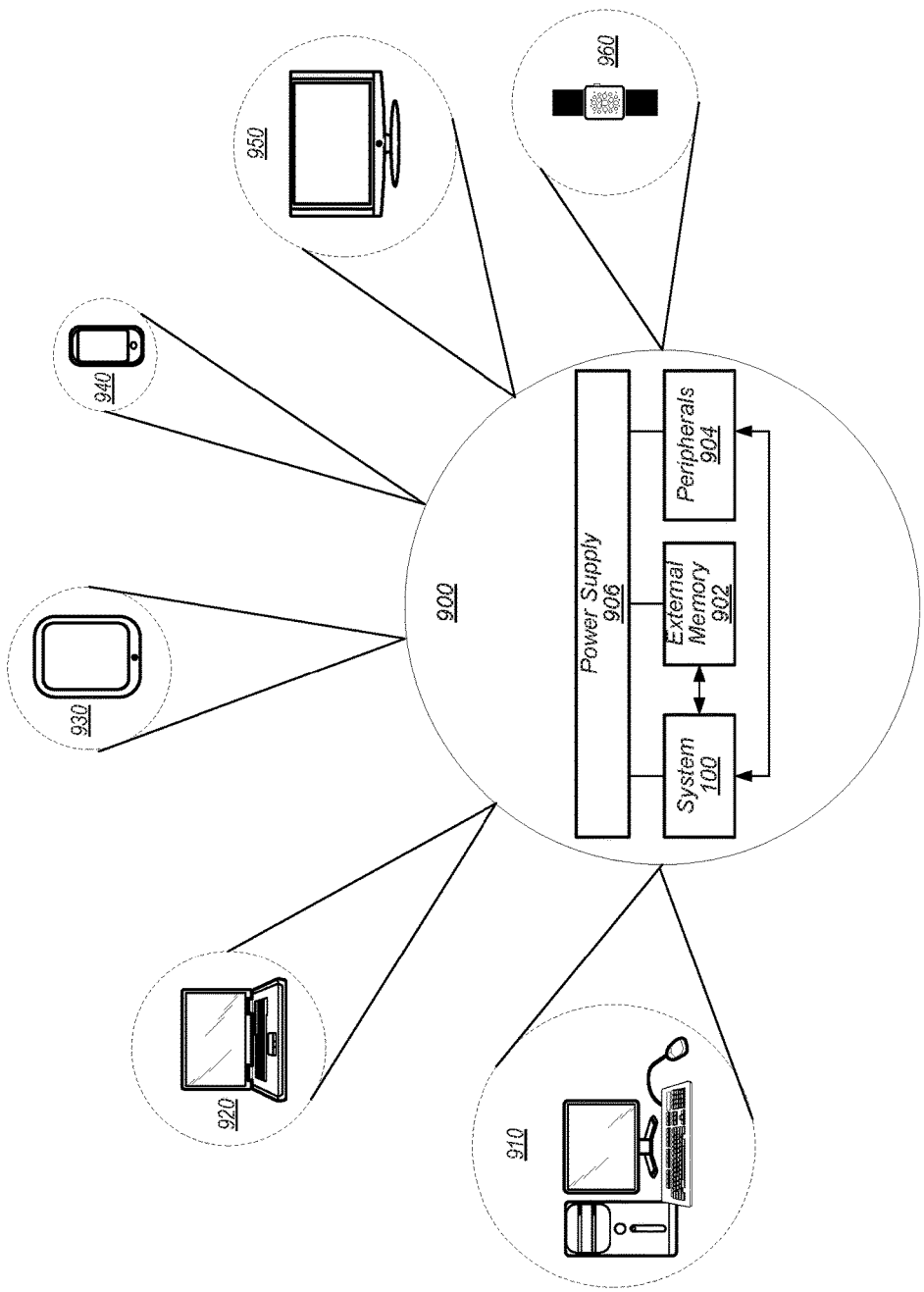
FIG. 9 is a block diagram of one embodiment of a system.

Referring next to FIG. 9, a block diagram of one embodiment of a system 900 is shown. As shown, system 900 may represent chip, circuitry, components, etc., of a desktop computer 910, laptop computer 920, tablet computer 930, cell phone 940, television 950 (or set top box configured to be coupled to a television), wrist watch or other wearable item 960, or otherwise. Other devices are possible and are contemplated. In the illustrated embodiment, the system 900 includes at least one instance of system 100 (of FIG. 1) coupled to an external memory 902.

System 100 is coupled to one or more peripherals 904 and the external memory 902. A power supply 906 is also provided which supplies the supply voltages to system 100 as well as one or more supply voltages to the memory 902 and/or the peripherals 904. In various embodiments, power supply 906 may represent a battery (e.g., a rechargeable battery in a smart phone, laptop or tablet computer). In some embodiments, more than one instance of system 100 may be included (and more than one external memory 902 may be included as well).

The memory 902 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with system 100 in a chip-on-chip configuration, a package-on-package configuration, or a multi-chip module configuration.

The peripherals 904 may include any desired circuitry, depending on the type of system 900. For example, in one embodiment, peripherals 904 may include devices for various types of wireless communication, such as wifi, Bluetooth, cellular, global positioning system, etc. The peripherals 904 may also include additional storage, including RAM storage, solid state storage, or disk storage. The peripherals 904 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a memory controller;
   a rate history table comprising a plurality of entries, wherein each of said entries is configured to store a single bit;
   a monitoring unit configured to:
      record a number of incoming requests to the memory controller during a programmable period of time;
      store a first value in an entry of the rate history table, responsive to determining the number of requests is greater than a first threshold;
      store a second value different than the first value in the entry of the rate history table, responsive to determining the number of requests is not greater than the first threshold;
      indicate the memory controller is in a high bandwidth state if the number of entries with the first value is greater than a second threshold; and
      indicate the memory controller is in a low bandwidth state if the number of entries with the first value is not greater than a second threshold;
   control logic configured to:
      generate a clock signal for the memory controller and a corresponding memory device;
      reduce a clock frequency of the clock signal responsive to the monitoring unit indicating a low memory bandwidth state for the memory controller.

2. The apparatus as recited in claim 1, wherein the control logic is further configured to:
   monitor a queue depth for the first memory controller over the programmable period of time; and
   reduce the clock frequency of the clock signal responsive to determining that the number of memory requests is less than the first threshold and responsive to detecting that the queue depth is less than a third threshold.

3. The apparatus as recited in claim 1, wherein the control logic is further configured to:
   detect that a calibration event will occur with a given period of time; and
   wait to reduce the clock frequency of the clock signal until after the calibration event is finished.

4. The apparatus as recited in claim 1, wherein the control logic is configured to:
   in response to the monitoring unit indicating a low memory bandwidth state for the memory controller, wait until an occurrence of a detected upcoming bus turnaround to cause a reduction in a clock frequency of the clock signal such that said reduction is performed during the bus turnaround.

5. The apparatus as recited in claim 1, wherein the control logic is further configured to adjust read and write latency parameters of a corresponding memory device responsive to reducing the clock frequency of the clock signal.

6. The apparatus as recited in claim 4, wherein the control logic is further configured to:
   wait to cause said reduction in further response to determining that the detected upcoming bus turnaround will occur with a given period of time; and
   cause said reduction without waiting until the detected bus turnaround, in response to determining that the detected upcoming bus turnaround will not occur with the given period of time.

7. The apparatus as recited in claim 1, wherein the first memory controller is configured to operate at the reduced clock frequency while simultaneously a second memory controller is configured to operate at a full clock frequency.

8. A method comprising:
   maintaining, by a memory controller, a rate history table comprising a plurality of entries, wherein each of said entries is configured to store a single bit;
   generating, by circuitry, a clock signal for the first memory controller and a corresponding memory device;
   a monitoring unit:
      recording a number of incoming requests to the memory controller during a programmable period of time;
      storing a first value in an entry of the rate history table, responsive to determining the number of requests is greater than a first threshold;
      storing a second value different than the first value in the entry of the rate history table, responsive to determining the number of requests is not greater than the first threshold;
      indicating the memory controller is in a high bandwidth state if the number of entries with the first value is greater than a second threshold; and
      indicating the memory controller is in a low bandwidth state if the number of entries with the first value is not greater than a second threshold;
   reducing a clock frequency of the clock signal responsive to the monitoring unit indicating a low memory bandwidth state for the memory controller.

9. The method as recited in claim 8, further comprising:
   monitoring a queue depth for the memory controller over the programmable period of time; and
   reducing the clock frequency of the clock signal responsive to determining that the number of memory requests is less than the first threshold and responsive to detecting that the queue depth is less than a third threshold.

10. The method as recited in claim 8, further comprising:
    detecting that a calibration event will occur with a given period of time; and
    waiting to reduce the clock frequency of the clock signal until after the calibration event is finished.

11. The method as recited in claim 8, further comprising:
in response to the monitoring unit indicating a low memory bandwidth state for the memory controller, waiting until an occurrence of a detected upcoming bus turnaround to cause a reduction in a clock frequency of the clock signal such that said reduction is performed during the bus turnaround.

12. The method as recited in claim 8, further comprising adjusting read and write latency parameters of a corresponding memory device responsive to reducing the clock frequency of the clock signal.

13. The method as recited in claim 8, further comprising:
waiting to cause said reduction in further response to determining that the detected upcoming bus turnaround will occur with a given period of time; and
causing said reduction without waiting until the detected bus turnaround, in response to determining that the detected upcoming bus turnaround will not occur with the given period of time.

14. The method as recited in claim 8, further comprising operating the first memory controller at the reduced clock frequency while simultaneously operating a second memory controller at a full clock frequency.

15. A computing system comprising:
a memory; and
a rate history table comprising a plurality of entries, wherein each of said entries is configured to store a single bit;
a memory controller configured to:
record a number of incoming requests to the memory controller during a programmable period of time;
store a first value in an entry of the rate history table, responsive to determining the number of requests is greater than a first threshold;
store a second value different than the first value in the entry of the rate history table, responsive to determining the number of requests is not greater than the first threshold;
indicate the memory controller is in a high bandwidth state if the number of entries with the first value is greater than a second threshold; and
indicate the memory controller is in a low bandwidth state if the number of entries with the first value is not greater than a second threshold;
control logic;
wherein the control logic is configured to:
generate a clock signal for the memory controller and the memory device; and
reduce a clock frequency of the clock signal responsive to the memory controller indicating a low memory bandwidth state for the memory controller.

16. The computing system as recited in claim 15, wherein the control logic is further configured to:
monitor a queue depth for the memory controller over the programmable period of time; and
reduce the clock frequency of the clock signal responsive to determining that the number of memory requests is less than the first threshold and responsive to detecting that the queue depth is less than a third threshold.

17. The computing system as recited in claim 15, wherein the control logic is further configured to:
detect that a calibration event will occur with a given period of time; and
wait to reduce the clock frequency of the clock signal until after the calibration event is finished.

18. The computing system as recited in claim 15, wherein the control logic is further configured to adjust read and write latency parameters of a corresponding memory device responsive to reducing the clock frequency of the clock signal.

19. The computing system as recited in claim 15, wherein the control logic is further configured to:
in response to the memory controller indicating a low memory bandwidth state for the memory controller, wait until an occurrence of a detected upcoming bus turnaround to cause a reduction in a clock frequency of the clock signal such that said reduction is performed during the bus turnaround.

20. The computing system as recited in claim 19, wherein the control logic is further configured to:
wait to cause said reduction in further response to determining that the detected upcoming bus turnaround will occur with a given period of time; and
cause said reduction without waiting until the detected bus turnaround, in response to determining that the detected upcoming bus turnaround will not occur with the given period of time.

* * * * *

UNITED STATES PATENT AND TRADEMARK OFFICE
CERTIFICATE OF CORRECTION

PATENT NO. : 10,175,905 B2
APPLICATION NO. : 15/263833
DATED : January 8, 2019
INVENTOR(S) : Jeter et al.

Page 1 of 1

It is certified that error appears in the above-identified patent and that said Letters Patent is hereby corrected as shown below:

In the Claims

Column 13, Claim 2, Line 56, please delete "first".

Signed and Sealed this
Nineteenth Day of March, 2019

Andrei Iancu
*Director of the United States Patent and Trademark Office*